Figure 1:
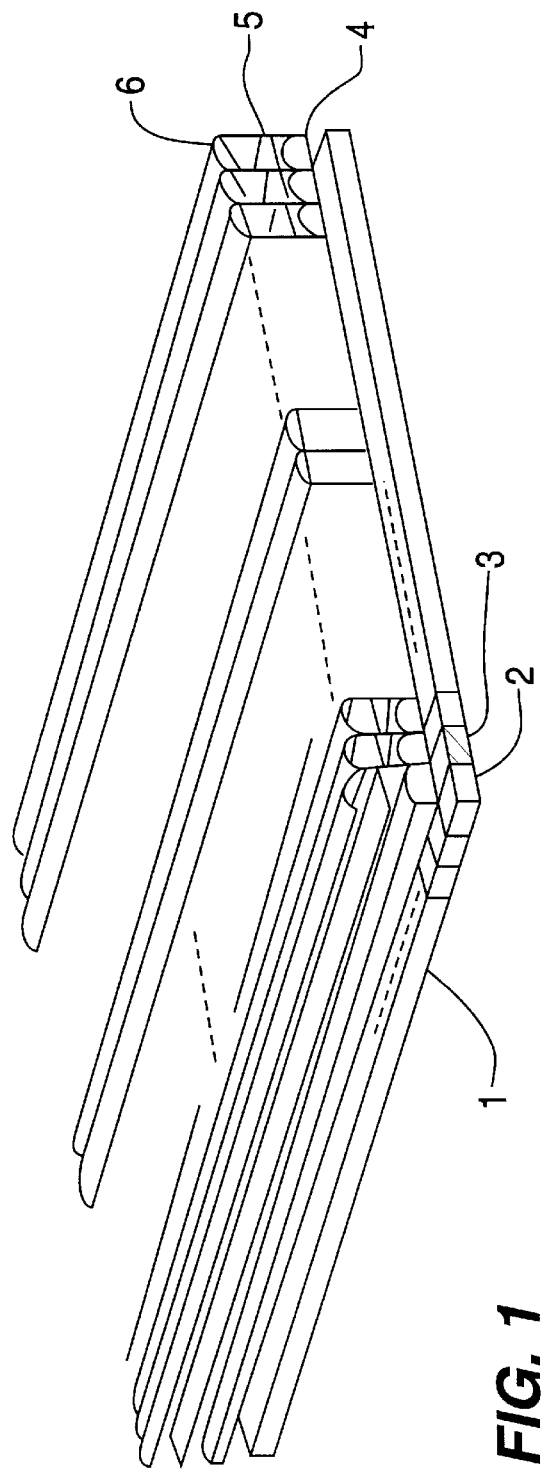

United States Patent
Chikazawa

[11] Patent Number: 5,852,512
[45] Date of Patent: Dec. 22, 1998

[54] PRIVATE STEREOSCOPIC DISPLAY USING LENTICULAR LENS SHEET

[75] Inventor: Yoshiharu Chikazawa, Kanagawa-ku, Japan

[73] Assignee: Thomson multimedia S.A., Boulogne-Billancourt, France

[21] Appl. No.: 733,422

[22] Filed: Oct. 18, 1996

[30] Foreign Application Priority Data

Nov. 13, 1995 [GB] United Kingdom .................. 9523189

[51] Int. Cl.⁶ .................................................. G02B 27/22
[52] U.S. Cl. ............................................ 359/463; 359/477
[58] Field of Search ..................................... 359/463, 462, 359/464, 467, 619, 622, 655, 477; 348/59; 349/15

[56] References Cited

U.S. PATENT DOCUMENTS

| | | | |
|---|---|---|---|
| 4,571,616 | 2/1986 | Haisma et al. | 348/59 |
| 4,807,965 | 2/1989 | Garakani | 359/464 |
| 4,987,487 | 1/1991 | Ichinose et al. | 359/464 |
| 5,036,385 | 7/1991 | Eichenlaub | 348/59 |
| 5,083,199 | 1/1992 | Borner | 359/464 |
| 5,475,419 | 12/1995 | Carbery | 359/464 |
| 5,500,765 | 3/1996 | Eichenlaub | 359/463 |
| 5,661,599 | 8/1997 | Borner | 359/463 |

FOREIGN PATENT DOCUMENTS

| | | | |
|---|---|---|---|
| 2-156021 | 1/1990 | Japan | 359/619 |
| 2272555 | 5/1994 | United Kingdom | H04N 13/04 |
| 2272597 | 5/1994 | United Kingdom | H04N 13/04 |

*Primary Examiner*—Jon Henry
*Attorney, Agent, or Firm*—Joseph S. Tripoli; Frederick A. Wein

[57] ABSTRACT

A private stereoscopic display is provided which has only one stereoscopic viewing position and does not show pseudoscopic images in areas outside the viewing position. On top of the display there is provided a first lenticular lens sheet followed by a prism array sheet and in general by a second lenticular lens sheet. Lens stripes are provided for rows of pixels, consisting normally of two rows of pixels for the left and right image. Two separate side lobes of the light rays generated by the first lenticular lens sheet. The individual lens pixel array arrangement are separated by barriers from each other. Because of those barriers only the main lobe of the light emating from the display is maintained, so that because of the prism array sheet and the second lenticular lens sheet main lobes for the left image are focused in a left image viewing point, whereas main lobes for the right image are focused in a right image viewing point.

13 Claims, 6 Drawing Sheets

PRIVATE STEREOSCOPIC DISPLAY USING LENTICULAR LENS SHEET

The invention relates to a stereoscopic display, in particular to a stereoscopic display using a lenticular lens sheet to generate the optical stereoscopic effect.

It is possible to see a stereoscopic image by the use of a binocular parallax, wherein a stereoscopic display using lenticular lens sheet is used. To see the stereoscopic image it is necessary to set the eyes at suitable positions. If the eyes are not set at suitable positions, a pseudoscopic image is seen because the lenticular lens sheet generates a main lobe and side lobes for the respective pixel sets. The stereoscopic image can be seen at the same time at different but appropriate positions. The pseudoscopic images can be seen because of the existence of the side lobes at any position which is different from the positions for the stereoscopic image. In other words, pseudoscopic images are generated in outer areas of the viewing area.

In particular situations, for example at money cash machines or video-telephones, it may be a disadvantage that other people than the viewer can see the image of the stereoscopic display because of the pseudoscopic images or the stereoscopic images created by the side lobes.

It is therefore an object of the present invention to provide a stereoscopic display usable e.g. for money cash machines, video-telephones or the-like, with which only one viewer can see the stereoscopic image and which does not exhibit pseudoscopic images.

The object is solved by the subject matter of the invention according to claim 1.

Further preferred embodiments of the invention are subject of the dependent claims.

The present invention comprises a stereoscopic display using a lenticular lens sheet with a display, wherein pixels for left and right images alter to form a mixed stripe image, and a lenticular lens sheet in front of the display, wherein the display further comprises lobe limiting means to limit the emanating rays of respective sets of pixels, so that only the main lobe passes to the viewer, and refraction means to direct left image main lobes to a left image viewing point and right image main lobes to a right image viewing point.

According to the invention the lenticular lens sheet and a prism array sheet are set above the flat panel display, if a flat display is used. Each set of the lenticular lenses and the prism array are then applied to only a set of pixels, normally consisting of one or two pixels, and each set is separated from the next set by a lobe limiting means which is usually formed by a barrier. Because of the lens and prism effect, only the main lobe leaves the display, whereas the side lobes are suppressed. With the refractive means, this main lobe from respective set of pixels is deflected and focused at a viewing distance. The main lobes for the left image focuses at a viewing point for the left image and the main lobes for the right image focuses at an respective focus point for the right image. Therefore only one person can see the image and no pseudoscopic images exist in an outer viewing area.

The invention has the following advantages:

The beam intensity is higher than in prior stereoscopic displays using lenticular lens sheets, because the rays from one pixel are formed to one beam only. Therefore, the display is brighter than prior stereocopic displays using lenticular lens sheets. Further it is impossible to see pseudoscopic images, because the display suppresses and therefore does not have side lobes. If the eyes are set at the correct position the system is an autostereoscopic display. Further the display according to the invention is a complete private display because only one viewing position exists in the space in front of the display.

In a preferred embodiment of the stereoscopic display according to the present invention the lobe limiting means are formed by barriers between adjacent sets of pixels, wherein the set of pixels can consist of two neighboring pixels as viewed in the scanning direction, or the set of pixels of the stereoscopic display can consist of one pixel only. Other amounts of pixel for forming the set of pixels are possible.

Further the refraction means of the stereoscopic display is formed by a prism array sheet, wherein each prism array of the stereoscopic display is set at an appropriate angle to direct the respective main lobe to the respective viewing point.

A second lenticular lens sheet of the stereoscopic display can be provided in front of the prism array sheet.

Further the shape of the lenticular lenses of the stereoscopic display can be different at each pixel set position.

In a preferred embodiment of the invention, the refraction means of the stereoscopic display is formed by a lenticular lens sheet combined with prisms.

Further the shapes of the lenticular lenses of both lenticular lens sheets can be different at each pixel set position.

Further a refractive means of the stereoscopic display is provided between the display and the lenticular lens sheet, wherein said refractive means can be realized by a prism array sheet. Each prism array of said prism array sheet is set at an appropriate deflection angle.

Further the lenticular lens sheet or the prism array sheet of the stereoscopic display is set on the flat panel display directly.

Figure 2:
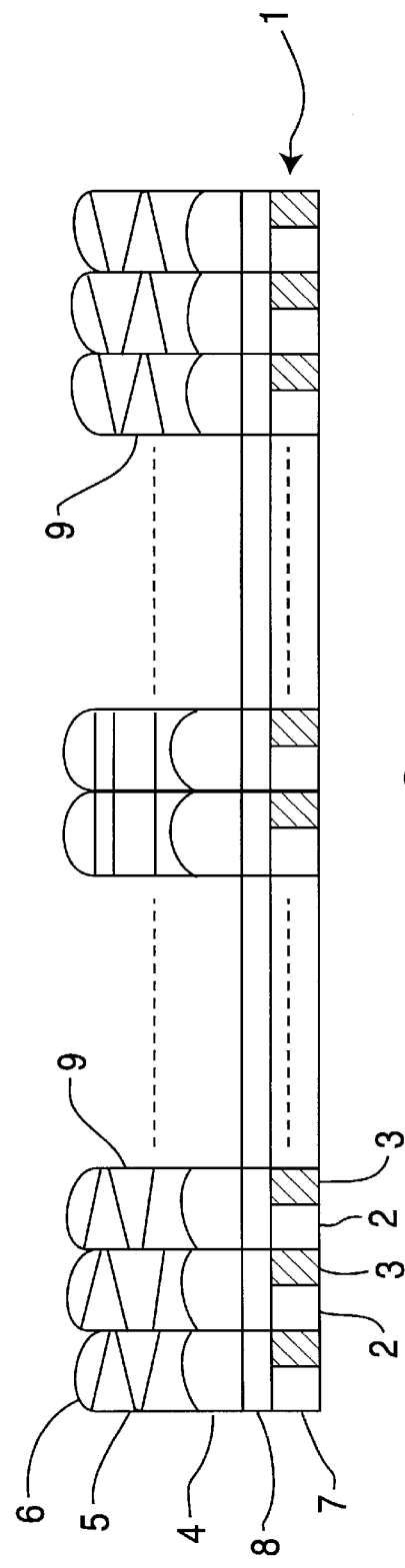
Figure 3:
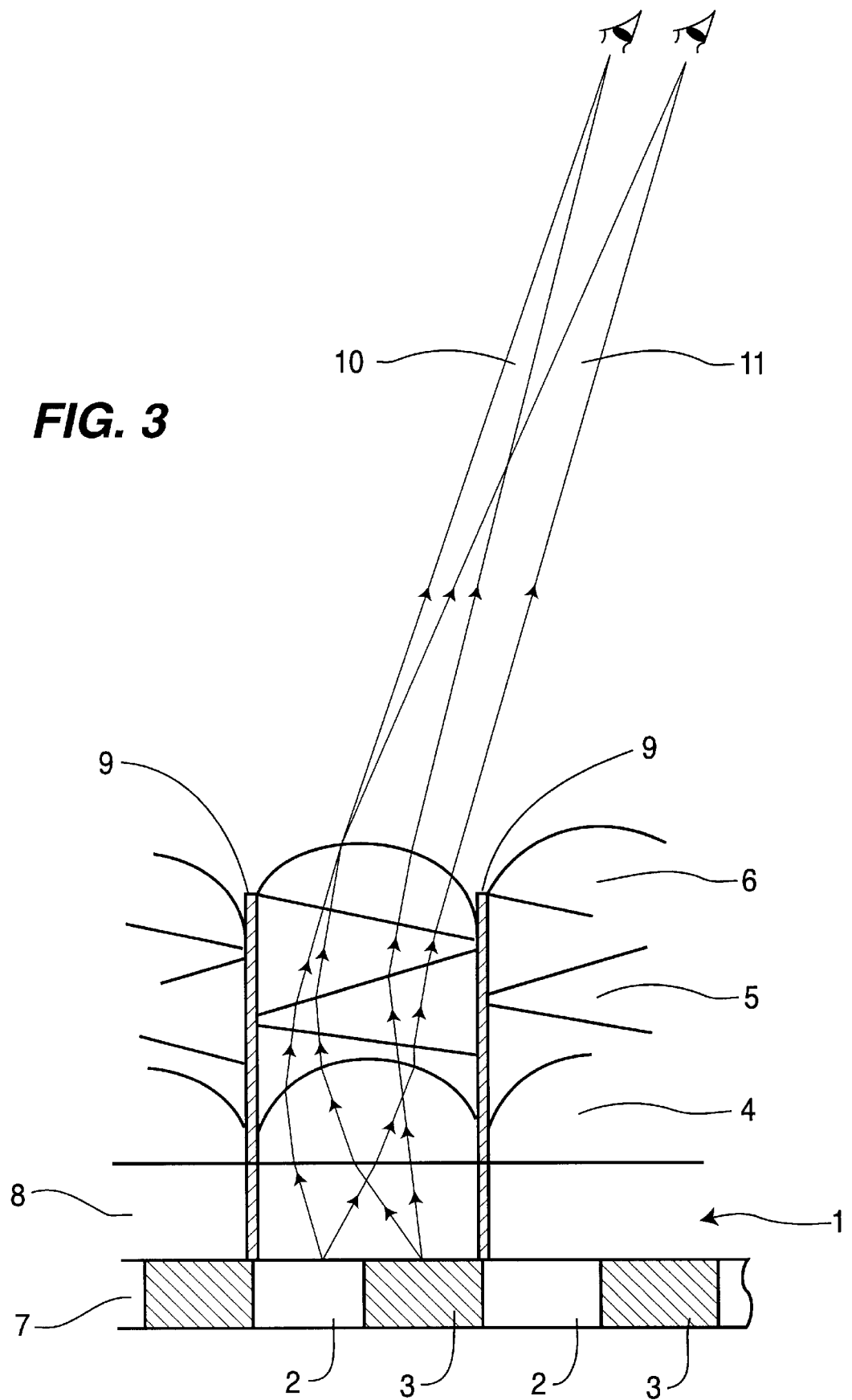
Figure 4:
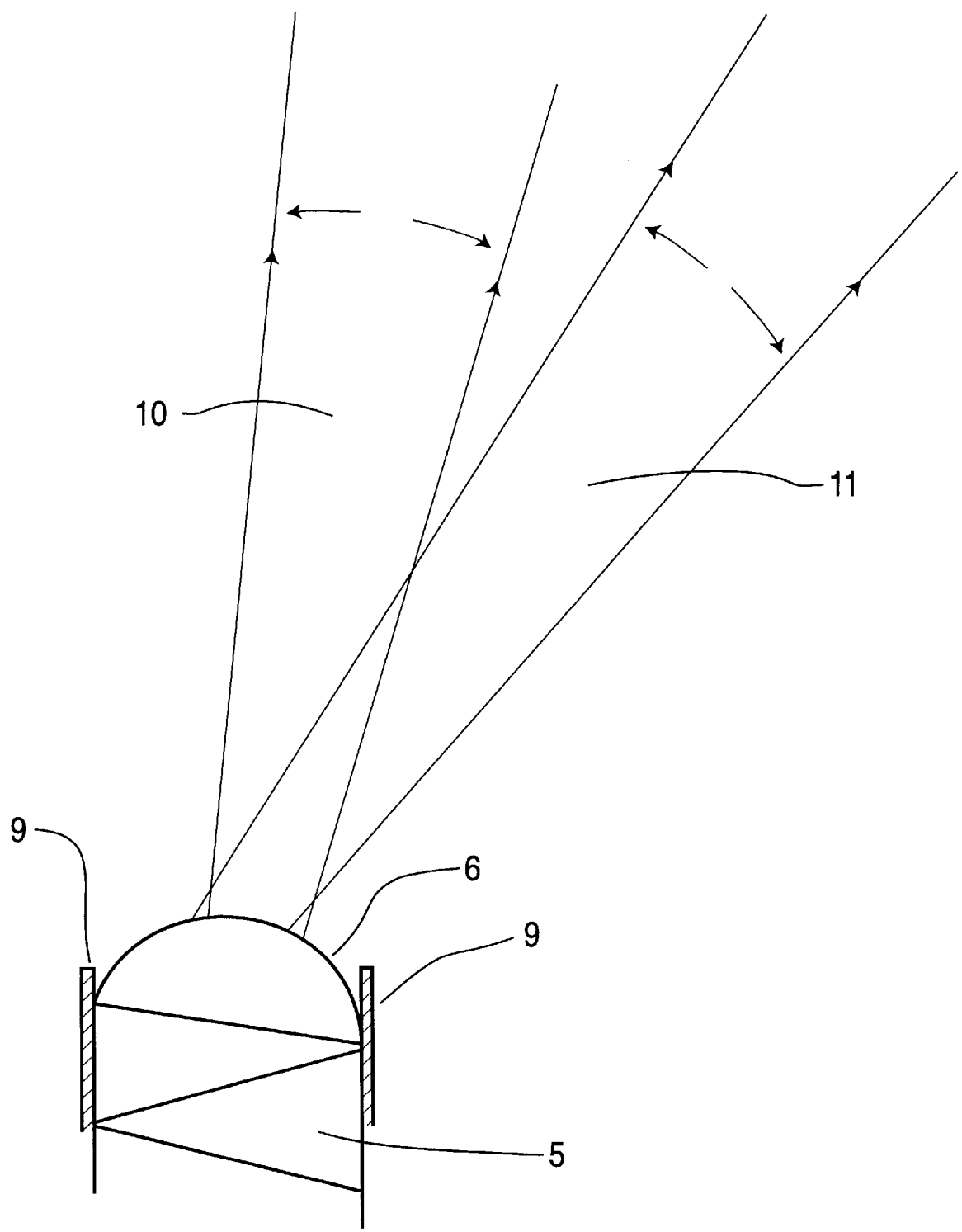
Figure 5:
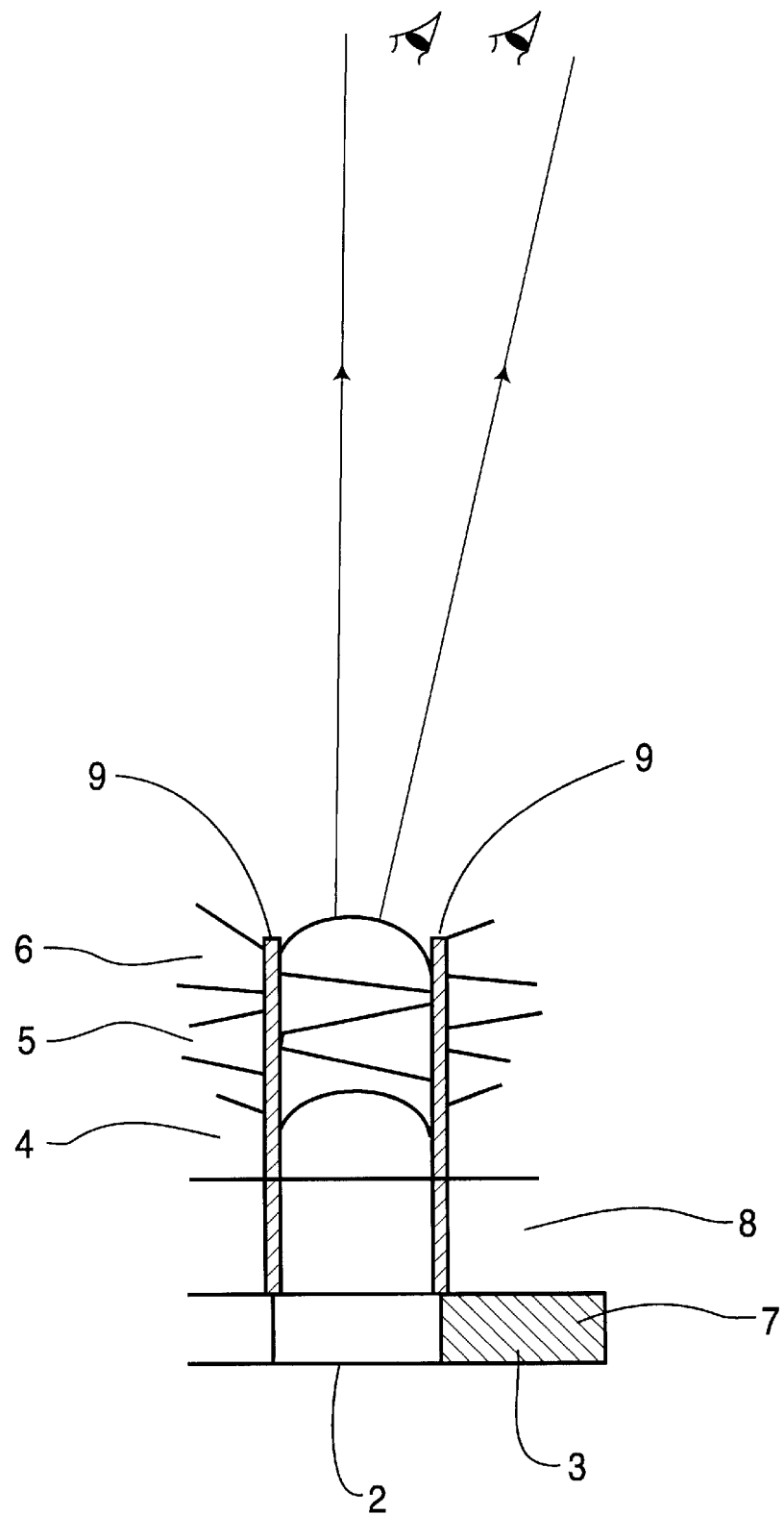
Figure 6:
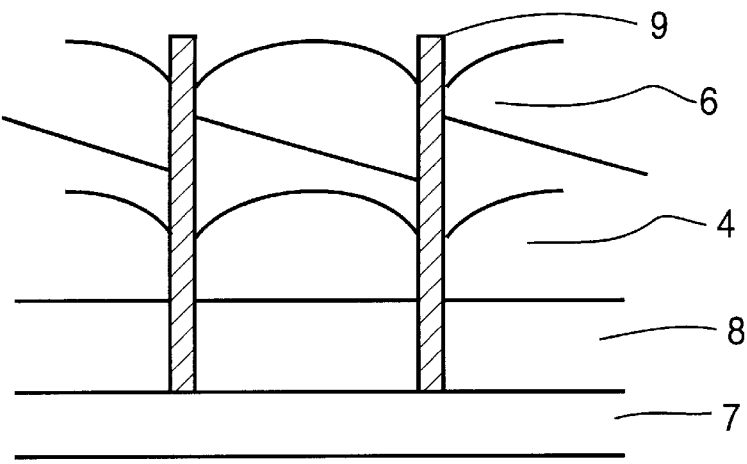
Figure 7:
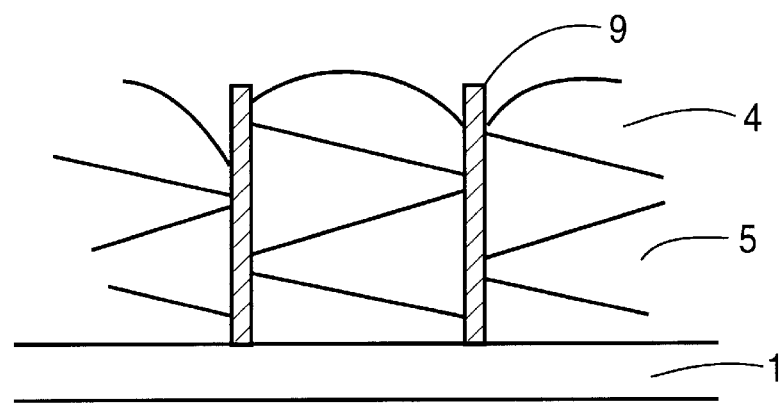

Preferred embodiments of a private stereoscopic display using lenticular lens sheets according to the invention will now be described by way of examples with reference to the accompanying drawings, in which:

FIG. 1 shows a perspective view of a private stereoscopic display using two lenticular lens sheets and one prism array sheet, FIG. 2 is a side view of the stereoscopic display according to FIG. 1, FIG. 3 shows a magnified part of FIG. 2, FIG. 4 shows a sideview of a prism and the second lenticular sheet, FIG. 5 shows a stereoscopic display, wherein the barriers and the lens and prism sheets are applied to only one pixel stripe, FIG. 6 shows an embodiment wherein the second lenticular lens sheet and the prism array sheet are combined, FIG. 7 shows an embodiment wherein the prism array sheet is provided between the display and the lenticular lens sheet.

Figure 8:
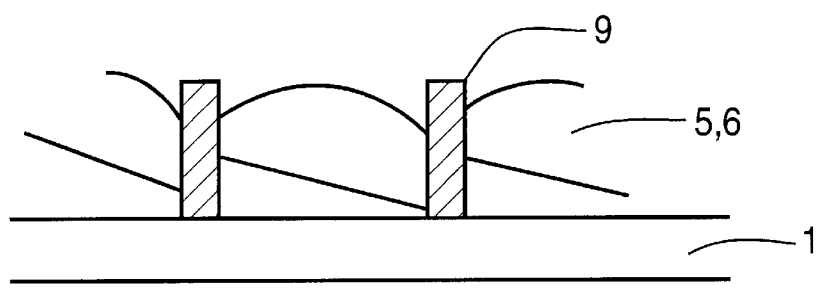
Figure 9:
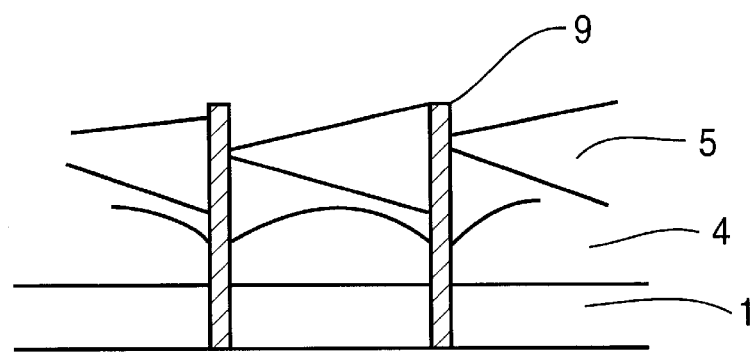
Figure 10:
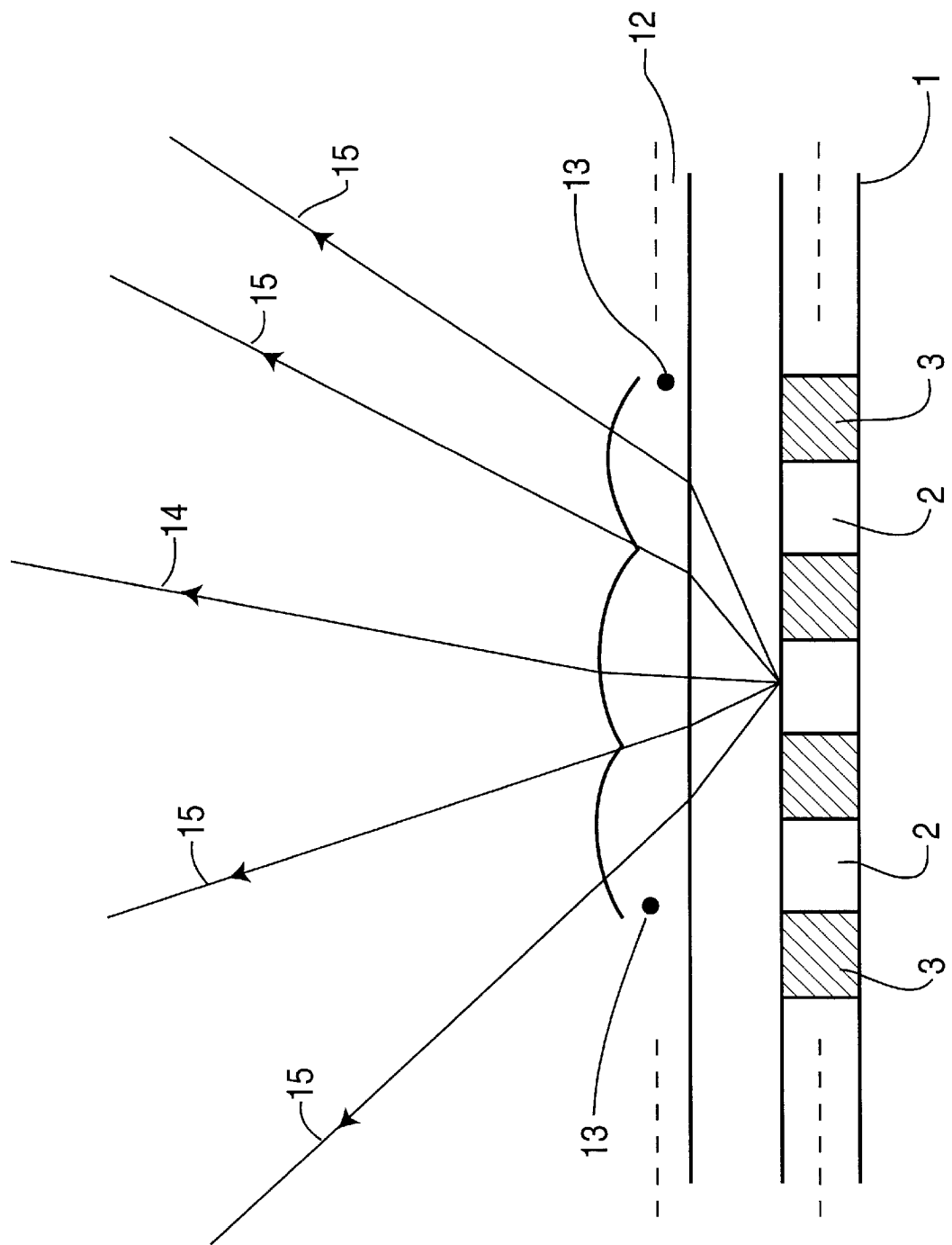

FIG. 8 shows an embodiment wherein the first lenticular lens sheet and the prism array sheet are combined, FIG. 9 shows an embodiment comprising the first lenticular lens sheet and the prism array sheet, and FIG. 10 shows the prior art stereoscopic display generating a plurality of lobes.

FIG. 10 shows a stereoscopic display according the prior art, wherein a lenticular lens sheet 12 is arranged in front of a flat panel display 1 consisting of stripes of pixels 2, 3 alternating for left and right images. FIG. 10 shows a side view, so that only a pixel row in the scanning direction is shown. Each lens 13 of the lenticular lens sheet 12 covers a set of two adjacent pixels 2, 3. With this arrangement for each pixel 2, 3 a main lobe 14 and left and right lobes 15 exist. Therefore, a plurality of stereoscopic viewing positions and pseudoscopic images exist.

FIG. 1 shows a perspective view of a stereoscopic display according to the invention with a flat panel display 1 which incorporates the pixel plane consisting of pixels 2 and 3 for the left and right image, which are arranged alternately in a row, so that a column consists of pixels for the left and right image, respectively, only. With this arrangement a so-called mixed stripe image is formed wherein the columns for left and right image alternate. A first lenticular lens sheet 4 is provided in front of the flat panel display 1 to generate the stereoscopic effect. This first lenticular lens sheet 4 is followed by a prism array sheet 5 consisting of prism arrays oriented along the pixel columns. These prism arrays deflect the main lobe of the emanating light of the pixels to the viewing point for the right and left image, respectively. As can be seen from FIG. 1 the angle of the prisms vary in respect to the relative position of the pixel arrays to the middle of the flat panel display. Therefore in the middle of the flat panel display 1 the prisms are degraded to a flat plate. On top of the prism array sheet 5 second lenticular lens sheet 6 is provided wherein the angle of the lens stripe vary as a function of the relative position to the middle of the flat panel display 1.

FIG. 2 shows a cross section of the stereoscopic display according to FIG. 1. A flat panel display 1 consisting of the pixel plane 7 with alternating pixels 2 and 3 and a front glass 8 has on top first lenticular lens sheet 4 followed by a prism array sheet 5 and a second lenticular lens sheet 6. The angle of the individual prisms of the prism array sheet 5 and the individual lenses of the second lenticular lens sheet 6 vary as a function of the relative distance to the middle of the display 1. In this embodiment the individual lenses and prisms of the first and second lenticular lens sheet and the prism array sheet cover a row of two pixels each. To suppress side lobes generated by the first lenticular lens sheet 4 the individual rows of lenses and prisms are separated by barriers 9 from each other. The area between the sheets 4, 5, 6 can be filled by any material, may be for mechanical fixing or it may be even air. The optical characteristics of this material must be taken into account for the optical properties of the sheets 4, 5, 6.

FIG. 3 shows a cross section through the prism and area stripes in more detail. Here a flat panel display 1 consisting of a pixel plane 7 with pixels 2 and 3 for the left and right image, respectively, is followed by a front glass 8. On top of the front glass 8 there is the first lenticular lens sheet 4 provided followed by a prism array sheet 5 and a second lenticular lens sheet 6. Between the individual stripes of lenses and prisms of the lenticular lens sheets 4 and 6 and the prism array sheet 5, a barrier 9 is provided. The distance between the different sheets 4, 5 and 6 is so chosen that only the main lobe generated by the first lens can pass along the light absorbing barriers. Therefore, this arrangement with two lenses and the prism creates a ray for the right eye and a ray for the left eye, each focused to the respective viewing point for the right and left eye.

FIG. 4 shows an enlarged view of FIG. 3, showing the prism of the prism array sheet 5 and the lens of the second lenticular lens sheet 6 together with barriers 9 on both sides in more detail. A ray 10 for the right eye and a ray 11 for the left eye are generated.

FIG. 5 shows a detailed cross section through a second embodiment of the invention, wherein the lenses and prism arrays are applied to one pixel only, i.e. to one pixel row. Therefore the pixel rows are separated by barriers 9. In this embodiment the expanded angle of the projective rays is about the width of the human face at the viewing position. Therefore the display system is not a stereoscopic display, but a private display where the image can be viewed only in the viewing position. The angles of the prisms of the prism array sheet 5 and shapes of the lenticular lenses of the lenticular lens sheets 4 and 6 are different at each pixel position.

FIG. 6 shows a cross section through a third embodiment of the invention, wherein the second lenticular lens sheet 6 and the prism array sheet 5 are combined so that the second lenticular lens sheet 6 has the lens and the prism effect of the first and second embodiments. In FIG. 6 the shapes of the lenticular lenses of the first lenticular lens sheet 4 and the second lenticular lens sheet 6 are different for each pixel position. The set of pixels are separated by barriers which rest on the flat panel display 1.

FIG. 7 shows a cross section through a fourth embodiment of the invention, wherein the prism array sheet 5 is arranged in the space between the flat panel display 1 and the first lenticular lens sheet 4. Here the angles of the prisms and the lenses of the prism array sheet 5 and the lenticular lens sheet 4 vary depending the pixel position.

FIG. 8 shows a cross section through a fifth embodiment of the invention, wherein the first lenticular lens sheet 4 is omitted and the prism array sheet 5 and the second lenticular lens sheet 6 are combined to form a lenticular lens sheet with the lens and prism effect of the foregoing examples. Here barriers 9 are resting on the flat panel display 1 and separate the prism/lens stripes of the combined second lenticular lens sheet. The shapes and angles of the lenticular lenses of the second lenticular lens sheet are different for each pixel position.

FIG. 9 finally shows a cross section through a sixth embodiment of the invention comprising a flat panel display 1, a first lenticular lens sheet 4 on top of it, followed by a prism array sheet 5. The individual sections of the prism array sheet and the lenticular lens sheet 4 are separated by barriers 9 resting on the flat panel display. The angles of the prism and the shape of the lenticular lenses of the lenticular lens sheet 4 are different for each pixel position.

I claim:

1. Stereoscopic display using a lenticular lens sheet comprising:
    a display wherein pixels for left and right images alternate to form a mixed stripe image,
    a lenticular lens sheet disposed in front of the display,
    refraction means for directing left image main lobes to a left image viewing point and right image main lobes to a right image viewing point, and
    barrier means disposed adjacent the refraction means for limiting emanating rays of respective sets of pixels to main lobes.

2. Stereoscopic display according to claim 1, wherein the set of pixels comprises two neighboring pixels.

3. Stereoscopic display according to claim 1 wherein the refraction means are formed by a prism array sheet.

4. Stereoscopic display according to claim 3, wherein each prism array is set at an appropriate angle to direct the respective main lobe to the respective viewing point.

5. Stereoscopic display according to claim 4, wherein a second lenticular lens sheet is provided in front of the prism array sheet.

6. Stereoscopic display according to claim 5, wherein the shape of the lenticular lenses are different at each pixel set position.

7. Stereoscopic display according to claim 1, wherein the refraction means is formed by a lenticular lens sheet combined with prisms.

8. Stereoscopic display according to claim 7, wherein the shapes of the lenticular lenses of lenticular lens sheets are different at each pixel set position.

9. Stereoscopic display according to claim 1, wherein the refractive means is disposed between the display and the lenticular lens sheet.

10. Stereoscopic display according to claim 9, wherein the refraction means comprises a prism array sheet.

11. Stereoscopic display according to claim 10, wherein the prism array is set at an appropriate deflection angle.

12. Stereoscopic display according to claim 1 wherein the lenticular lens sheet or a prism array sheet is set directly on the flat panel display.

13. A stereoscopic display comprising:

a display wherein pixels for left and right images alternate to form a mixed stripe image, refraction means for directing left image main lobes to a left image viewing point and right image main lobes to a right image viewing point, a lenticular lens sheet disposed in front of the display between the mixed strip image and the refraction means, and barrier means for limiting emanating rays of respective sets of pixels to the main lobe.

* * * * *